UNITED STATES PATENT OFFICE.

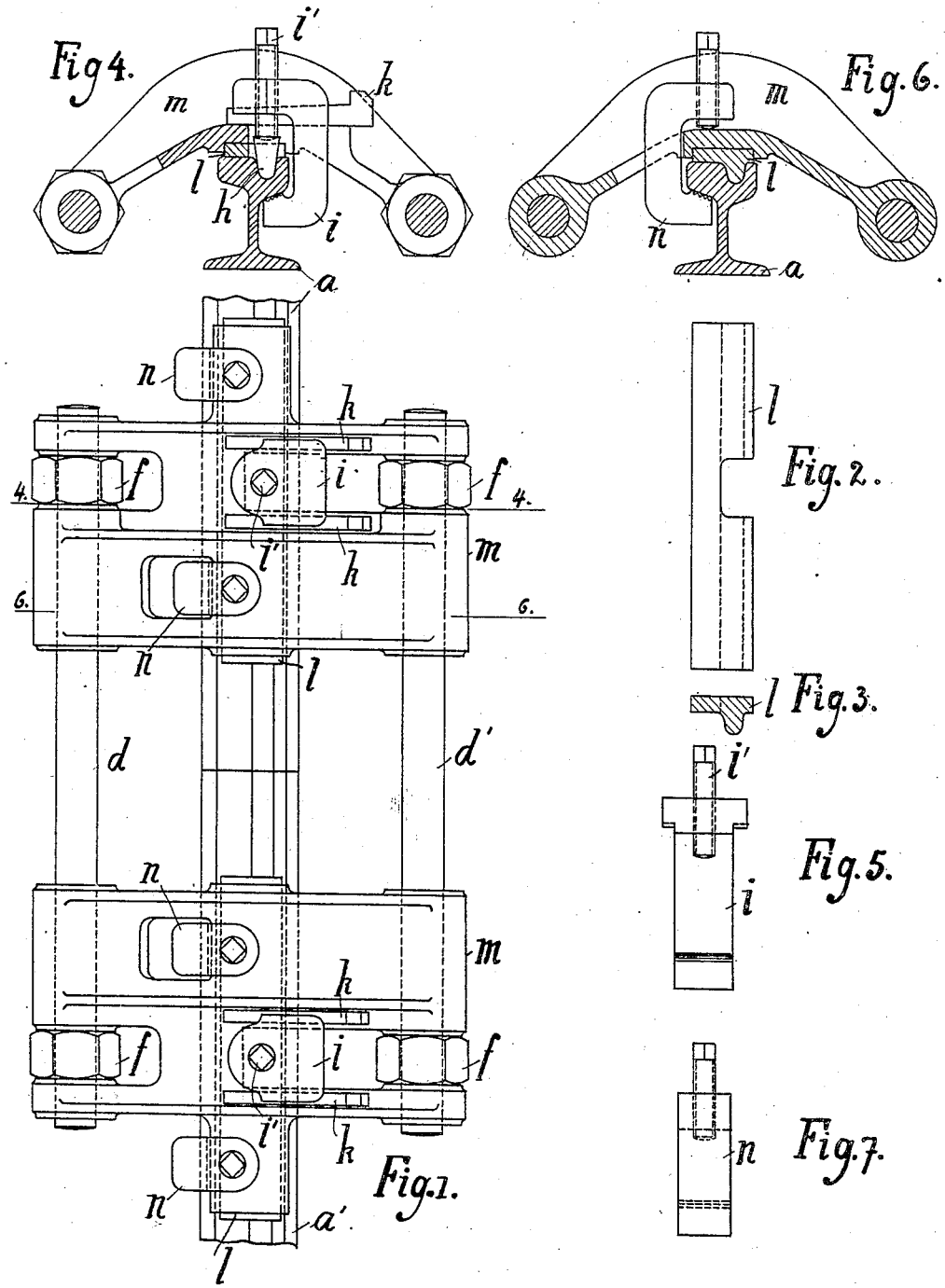

FELIX LANGE, OF ESSEN-ON-THE-RUHR, GERMANY, ASSIGNOR TO TH. GOLDSCHMIDT, A FIRM COMPOSED OF KARL GOLDSCHMIDT AND HANS GOLDSCHMIDT, OF ESSEN-ON-THE-RUHR, GERMANY.

APPARATUS FOR ALINING RAIL ENDS.

1,050,063.  Specification of Letters Patent.  Patented Jan. 7, 1913.

Original application filed March 18, 1910, Serial No. 550,201. Divided and this application filed July 29, 1911. Serial No. 641,312.

*To all whom it may concern:*

Be it known that I, FELIX LANGE, a subject of the German Emperor, residing at Essen-on-the-Ruhr, Germany, have invented certain new and useful Improvements in Apparatus for Alining Rail Ends, of which the following is a specification.

This invention relates to an apparatus for alining rail-ends for the purpose of bringing them into position for welding, as by butt-welding, and especially to apparatus of this type in which means is provided for producing relative longitudinal movement of the rail-ends after they are properly alined.

The invention is especially adapted for use in connection with the welding of rails together by the aluminothermic process, in which it is of the utmost importance that the ends to be joined be accurately alined in order to produce a good and satisfactory joint.

In apparatus of this class as heretofore constructed the devices employed therein have usually been adapted to engage the web portions of the rails, that is, the portions between the head and the foot of each rail, and in such cases it has sometimes been difficult to bring the tread surfaces of adjoining rail-ends into accurate alinement, especially in cases where there has been any difference, however slight, in the shapes of the cross-sections of such rails.

In a prior application filed by me March 18, 1910, Serial Number 550,201, I have disclosed an apparatus which is distinguished from apparatus theretofore employed for alining rail-ends chiefly by reason of the fact that the alining means employed has guide surfaces or alining surfaces which coöperate directly with the tread surfaces of the rails and gage the positions thereof, and when the gaging is from these tread surfaces downward in the rail, the treads, when the rail-ends are welded together while in such alined positions, will remain in a common plane, and if there is any slight difference in the shapes of the cross-sections of the rails welded together there will be no misalinement at the tread, whatever error there is being lower down in the rail where it will not affect the continuity of the smooth surface on which the wheels have to run and where it can be readily corrected or otherwise taken care of if necessary.

This improved apparatus for alining rail-ends for welding may be employed (as set forth in my aforesaid application) either in connection with ordinary T-headed or bull-headed rails, or for alining grooved rails, etc., the main feature of the apparatus employed in each case being the provision of alining means coöperative directly with the treads of the rails.

The present application is a division of my aforesaid application, Serial Number 550,201, filed March 18, 1910, and is directed specifically to an apparatus especially adapted for use in connection with grooved rails, etc.

This and other features of the invention which will be hereinafter described and claimed are illustrated in the accompanying drawings, in which—

Figure 1 is a plan of a type of apparatus adapted for use in connection with grooved rails; Figs. 2 and 3 are respectively a plan and a cross-section of the principal alining or guide element of the apparatus illustrated in Fig. 1; Fig. 4 is a transverse section of said apparatus, the section being taken in the line 4—4, Fig. 1; Fig. 5 is a detail of a clamp employed in connection with said apparatus; Fig. 6 is a transverse section of the apparatus shown in Fig. 1, the section being taken in the line 6—6 of said figure, and Fig. 7 is a side elevation illustrating in detail another clamp member used in said apparatus.

Referring to the drawings, and especially to Figs. 1, 4 and 6, these views illustrate the type of apparatus preferably employed for alining the heads of grooved rails, two such rails being indicated at $a$, $a'$. The apparatus for alining the ends of these rails is preferably so constructed as to be capable of being secured as a whole to the ends of the rails to be alined. The main features of the apparatus are a frame adapted to be secured directly to the rails and alining means carried by the frame and embodying guide surfaces constructed to fit the grooved surfaces of the rails. These guide-surfaces may be embodied in guides or alining members proper of any suitable construction fitting the grooves of the rails. The guides employed are preferably of the type indicated at *l* and have projections shaped to fit the grooves in the rails. By means of guides of this type a stronger grip may be obtained than with flat guides, such as are illustrated in my aforesaid application. This is important, as grooved rails are usually of greater cross-sectional area than the bull-head rails shown in the aforesaid application, and require to be gripped with greater pressure during the welding operation. It will be seen by referring to Fig. 6 that these guides *l* not only serve to aline the rails both horizontally and vertically, but also have a very large contact surface in engagement with the tread and the grooved surfaces of the rail. The importance of vertical alinement is fully set forth in my aforesaid application, in which I have shown means for obtaining proper alinement not only in the line of the tread surfaces, but also accurate alinement of the sides of the rail-heads corresponding to the straight line or definite curvature which the track and its rails are intended to have. In this case this vertical alinement is due to the coöperation of the side walls of the projecting portions of the guides with the corresponding walls of the grooves in the rails.

The guides or alining devices just described are preferably mounted in corresponding guideways in the under sides of the frame of the apparatus. The main members of this frame are preferably two end-pieces in the form of yokes or saddles adapted to straddle the rails and receive at their under sides the guides just described, the guideways in which such guides *l* are received being preferably in the under sides of these end-pieces, which may be of the type indicated at *m*. The other main members of the frame are preferably heavy rods *d, d'* mounted in parallelism with each other and secured to the end-pieces *m* in such a manner that the guides *l* will have all of their guide surfaces, horizontal, vertical, etc., in exact alinement with one another. The connection is preferably made in such a manner as to permit relative movement of said guides, etc. for the purposes of adjustment. In the construction illustrated the rods *d, d'* are mounted in long parallel guideways near opposite edges of the yokes or saddles *m*, the construction being such that the alinement of the guides will be maintained whatever may be the relative positions of the members *m* carrying said guides. For the purpose of obtaining and maintaining any desired adjustment of these parts toward or from each other the rods *d, d'* are preferably threaded to receive nuts, such as *f*, for moving the parts toward or away from each other and for holding them in such positions. These nuts are shown as located in cut-away portions of the members *m*, the construction being such that the cheeks of the nuts *f* are always in engagement with the cheeks of these cut-away portions. By turning the nuts in one direction or the other the desired movement of the members *m* and the guides *l* may be obtained, the nuts and the coöperating cheeks of the parts *m* serving to maintain such adjustment when the nuts have been turned to the desired extent.

The frame formed by the parts *m* and *d, d'* may be fastened to the rails *a, a'* by any suitable means. The clamping means employed is preferably such as to hold the guides *l* firmly against the treads of the rails at all points in the lengths of the guides while also serving to clamp the frame as a whole in such a manner that there can be no relative movement between the frame and the rails either lengthwise or crosswise of the latter. Separate clamping devices should be employed in connection with each of the members *m*, three open-sided clamps being shown. Two of these clamps are mounted in cut-away portions of opposite sides of the members *m*, while the third is mounted in a slot extending vertically through the same member. Two of these clamps are located at one side of the rail and the other at the opposite side. The first two are indicated at *n*. The third clamp of each set is preferably of the type indicated at *i* and embodies a wedge device adapted to pass through an opening in one side of the guide *l* and enter the groove in the head of the rail, as illustrated in Fig. 4. This wedge device is indicated at *h* and is here placed below the end of the clamp-screw *i'*. When this clamp is in place and its screw turned to tighten it the wedge is driven directly in the groove of the rail and the clamp thus secured directly to the rail both at the upper and under sides of the rail-head, thereby preventing slipping of the parts lengthwise of the rails. Thus a strong and independent grip is obtained directly upon the rail between the ends of the guide, which might not otherwise be obtained if there were any irregularity in the rail and the guide *l* were rigid.

Between the yokes *m* and the under sides of the upper part of the clamp *i*, wedges, such as *k*, may be driven in order to correct any cant over due to the clamps *n* being both placed at the same side of the rail, the under sides of the upper part of the clamp *i* having beveled faces, as indicated in Figs. 1, 4 and 5, for coöperation with these wedges *k*.

When the three clamps carried by each yoke are tightened each yoke, guide and rail-end will be firmly clamped together and the treads of the two rails and the sides of the rail-heads will be accurately alined. If the nuts *f* are now turned in the proper direction for drawing the yokes and their guides together the ends of the rails may be readily brought into engagement without disturbing the horizontal alinement of the treads of the rails or the vertical alinement of the sides of the rail-heads. By means of this apparatus the rail-ends may be held in this position until the welding operation is finished.

What I claim is:

1. In an apparatus for alining the ends of a pair of grooved rails for welding, the combination with a frame, of a pair of alined guides carried by said frame and each located at a distance from the meeting faces to be welded, said guides being constructed to fit the grooved treads of said rails; and means for clamping said guides and treads together.

2. In an apparatus for alining the ends of a pair of grooved rails for welding, the combination with a frame, of a pair of alined guides carried by said frame and constructed to fit the grooved treads of said rails one of said guides having an opening which passes through it, and means for clamping said guides and treads together, said means embodying a clamp having a wedge device adapted to pass through said opening in one of the guides and be wedged in the groove in the head of the corresponding rail.

3. In an apparatus for alining the ends of a pair of grooved rails for welding, the combination with a frame, of a pair of alined guides carried by said frame and each located at a distance from the meeting faces to be welded, said guides being constructed to fit the grooved treads of said rails, means for clamping said guides and treads together, and means for simultaneously adjusting said guides and rails toward or from each other.

4. In an apparatus for alining the ends of a pair of grooved rails for welding, the combination with a frame having alined undercut guideways therein, of guides in said guideways and each located at a distance from the meeting faces to be welded, said guides being constructed to fit the grooved treads of said rails, and means for clamping all of said parts together.

5. In an apparatus for alining the ends of a pair of grooved rails for welding, the combination with a frame, of a pair of alined guides carried by said frame and constructed to fit the grooved treads of said rails one of said guides having an opening which passes through it, and means for clamping said guides and treads together, said means embodying a clamp having a wedge device adapted to pass through said opening in one of the guides and be wedged in the groove in the head of the corresponding rail and also embodying a wedge between said frame and clamp and disposed at substantially a right angle to said wedge device.

FELIX LANGE. [L. S.]

Witnesses:
CHAS. J. WRIGHT,
ALFRED HENKEL.